(12) United States Patent
Ciccone et al.

(10) Patent No.: US 6,241,931 B1
(45) Date of Patent: Jun. 5, 2001

(54) THREADED LID INJECTION MOLD RELEASE

(75) Inventors: Vince Ciccone, Kleinberg; Jerko Knezovic, Brampton, both of (CA)

(73) Assignee: Top Grade Machining Ltd., Mississauga (CA)

( * ) Notice: Subject to any disclaimer, the term of this patent is extended or adjusted under 35 U.S.C. 154(b) by 0 days.

(21) Appl. No.: 09/088,317

(22) Filed: Jun. 1, 1998

(51) Int. Cl.[7] .............................. B29C 33/44; B29C 45/44
(52) U.S. Cl. .............................. 264/318; 264/334; 249/59; 425/418; 425/451.4; 425/577
(58) Field of Search .................................. 425/451.4, 809, 425/577, 556, DIG. 5, DIG. 58, 418; 264/318, 328.1, 334; 249/59

(56) References Cited

U.S. PATENT DOCUMENTS

| | | | |
|---|---|---|---|
| 4,346,811 | * | 8/1982 | Hilaire ................................ 215/252 |
| 4,519,569 | * | 5/1985 | Nolan .................................. 249/142 |
| 4,610,621 | * | 9/1986 | Taber et al. ......................... 425/577 |
| 4,622,198 | * | 11/1986 | Gallusser et al. ................... 264/318 |
| 4,806,301 | * | 2/1989 | Conti .................................. 264/334 |
| 5,383,780 | * | 1/1995 | McCready et al. ................. 425/552 |
| 5,447,674 | * | 9/1995 | Schellenbach ...................... 264/255 |
| 5,507,632 | * | 4/1996 | Payne ...................................... 425/4 |
| 5,609,894 | * | 3/1997 | Rathbun ............................. 425/556 |
| 5,776,521 | * | 7/1998 | Wright et al. ....................... 425/556 |
| 5,846,471 | * | 12/1998 | Thakor et al. ...................... 264/296 |

FOREIGN PATENT DOCUMENTS

696643 * 9/1940 (DE) ............................. 425/DIG. 58

OTHER PUBLICATIONS

Weast, Robert C., ed. CRC Handbook of Chemistry and Physics 58th edition, CRC Press Inc. pp. B–10, 11; B–54, 55.*

* cited by examiner

Primary Examiner—Harold Pyon
Assistant Examiner—Emmanuel S. Luk
(74) Attorney, Agent, or Firm—Cummings & Lockwood

(57) ABSTRACT

Apparatus and a method for injection molding large container lids of the type having threads for screwing the lids onto and off large containers. The apparatus includes an injection mold having a cavity mold portion and a core mold portion which together define the shape of the lid. The core mold portion includes a stationary annular ring that defines the lid threads. A co-axial, rotatable center section of the core mold portion is opened to spin the molded lid off the core mold portion and release it from the mold.

18 Claims, 5 Drawing Sheets

US 6,241,931 B1

THREADED LID INJECTION MOLD RELEASE

FIELD OF THE INVENTION

The present invention relates plastic injection molding, and in particular, to injection molding large container lids having threads for attaching the lids to a container.

BACKGROUND OF THE ART

Large containers, for example, in the 10 to 20 liter (2.5 to 5.0 gallon) size, have been produced in the past where the lids screw onto the containers. Such lids have been produced by injection molding them in molds that have an annular thread-forming ring. When the lid has been molded and the mold opened, the lid is removed from the mold by rotating the annular ring, effectively to unscrew the mold from the lid. A difficulty with this method of molding these lids, however, is that the thread-forming annular ring has to be sealed in the mold during the molding process. In the past, this has been done by using large diameter O-rings. The problem is that such O-rings deteriorate or wear out very quickly due to the rotation of the annular ring against the O-rings.

The present invention overcomes these problems by eliminating these large O-rings. The thread-forming annular ring is made stationary in the mold and a rotatable mold center section spins the lid after it is molded to unscrew the lid from the mold.

SUMMARY OF THE INVENTION

According to one aspect of the invention, there is provided, a threaded lid injection mold comprising a cavity mold portion defining the outer shape of an injection molded lid and core mold portion defining the inner shape of the injection molded lid. The cavity and core mold portions mate to define the shape of the lid and include means for injecting plastic into the mold to form the lid and means for separating the mold portions to permit removal of the molded lid. The core mold portion includes a stationary thread forming annular ring and a co-axial rotatable center section located inside the annular ring. The center section includes axially disposed engagement surfaces for turning the molded lid upon rotation of the center section after a lid has been molded and the mold portions have been separated. Also, drive means are provided for rotating the center section.

According to another aspect of the invention there is provided a method of injection molding a threaded lid comprising the steps of providing a mold having mating cavity and core mold portions to define the shape of the lid. One of the cavity and core portions includes a stationary thread-forming annular ring. The mold portions are closed and plastic is injected therein to form the lid. The mold portions are opened and the molded lid is spun to unscrew and release it from the thread-forming annular ring. The molded lid is spun by providing a mold center section axially located inside the annular ring. The center section includes axially disposed engagement surfaces for engagement with a lid injection molded in the mold. The lid is spun by spinning the center section.

BRIEF DESCRIPTION OF THE DRAWINGS

Preferred embodiments of the invention will now be described, by way of example, with reference to the accompanying drawings, in which.

DETAILED DESCRIPTION OF THE PREFERRED EMBODIMENTS

Figure 1:
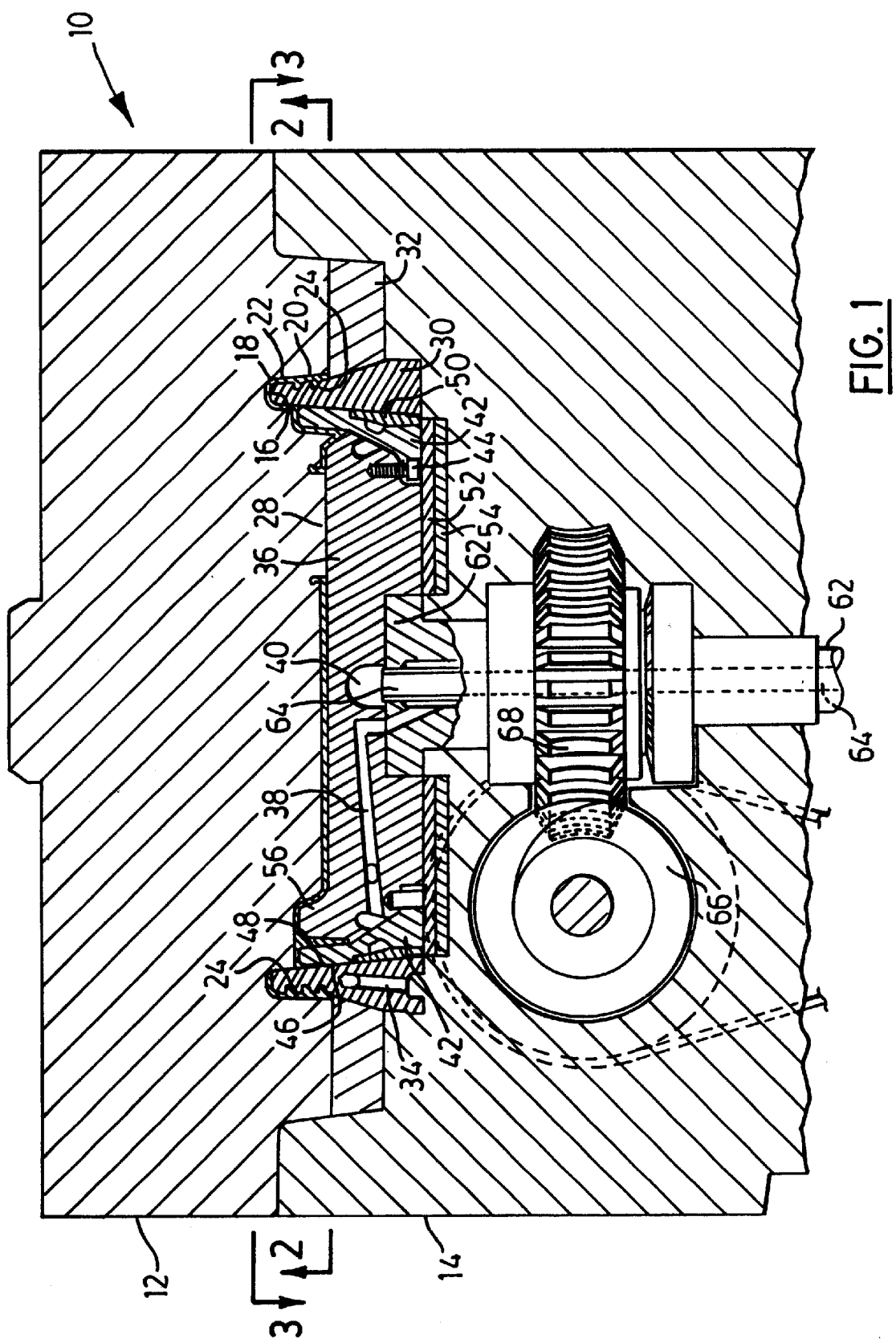
FIG. 1 is a horizontal sectional view, looking downwardly, of a preferred embodiment of threaded lid injection mold according to the present invention.

Referring firstly to FIG. 1, a preferred embodiment of a threaded lid injection mold according to the present invention is generally indicated by reference numeral 10. Injection mold 10 includes a cavity mold portion 12 which defines the outer shape of the lid to be injected molded in injection mold 10. Injection mold 10 also includes a core mold portion 14 which defines the inner shape of the lid to be injection molded in injection mold 10. Cavity and core mold portions 12, 14 mate to define the shape of the lid, as will be appreciated by those skilled in the art.

For the purposes of clarity, the means for injecting plastic into the mold is not shown in the drawings, nor has the means for mounting the mold portions in an injection molding machine been shown in the drawings. The injection molding machine provides the means for opening and closing the mold portions. Also, although some cooling passages are shown in the drawings, it will be appreciated that a typical mold will have many cooling circuits and passages formed therein. Except where discussed below, the cooling circuits and passages and the plastic injection passages are not considered to be part of the present invention, so will not be described in further detail herein.

Figure 2:
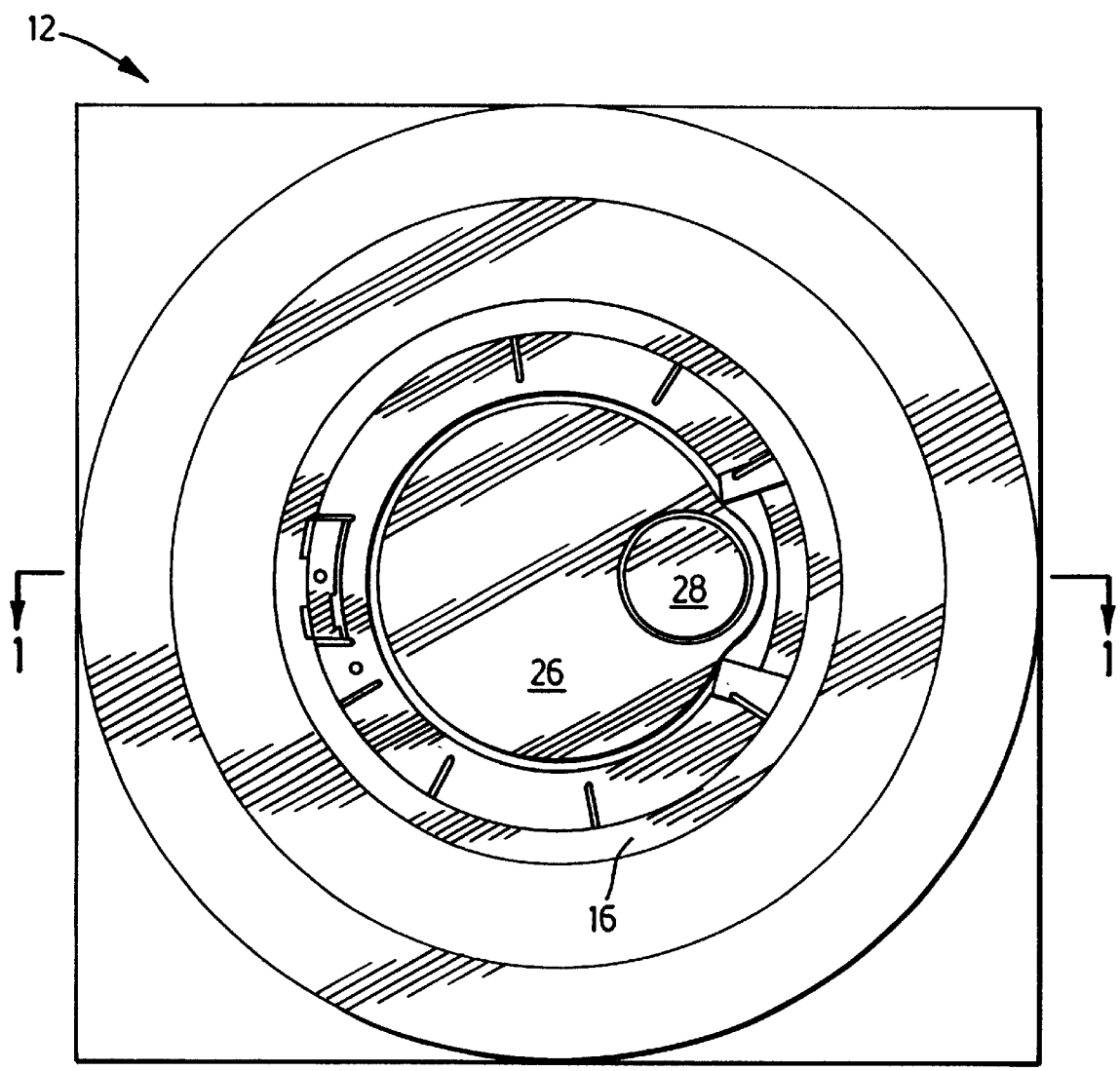
FIG. 2 is an elevational view of the cavity portion of the mold taken along lines 2—2 of FIG. 1.

Referring in particular to FIG. 2, this is an elevational view of cavity mold portion 12. The particular configuration of the mold surfaces defining the outer shape of the lid can be anything desired and is not considered to be part of the present invention. In the embodiment illustrated in the drawings, however, there is an annular groove 16 in cavity mold portion 12. Referring again to FIG. 1, which shows a lid 22 to be injection molded in injection mold 10, this annular groove 16 defines an outer annular rim 18. This outer annular rim 18 has an outer peripheral skirt 20 of the lid 22 to be injection molded in injection mold 10. It is outer peripheral skirt 20 that is formed with threads 24 on the inside thereof for screwing lid 22 onto a container (not shown) having mating threads formed about its opening.

Cavity mold portion 12 also has a flat center section 26 and an upstanding plug 28 which forms a fill opening in lid 22. Again, these are features which are particular to the shape of the lid to be molded. These and the other mold surfaces shown inside annular groove 16 in FIG. 2 can be anything desired and are illustrated only as examples for the purposes of this disclosure.

Figure 3:
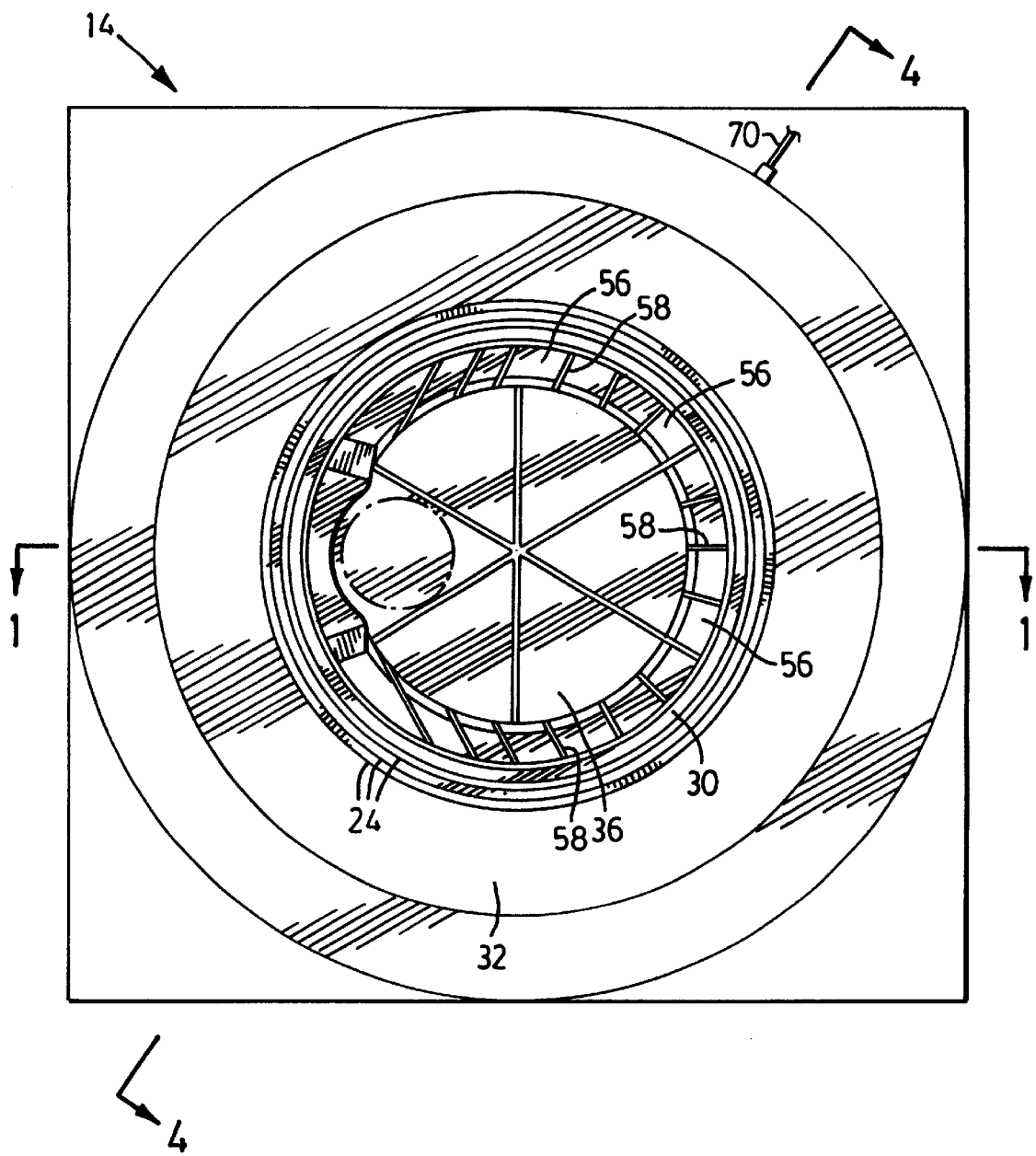
FIG. 3 is an elevational view of the core portion of the mold taken along lines 3—3 of FIG. 1.
Figure 4:
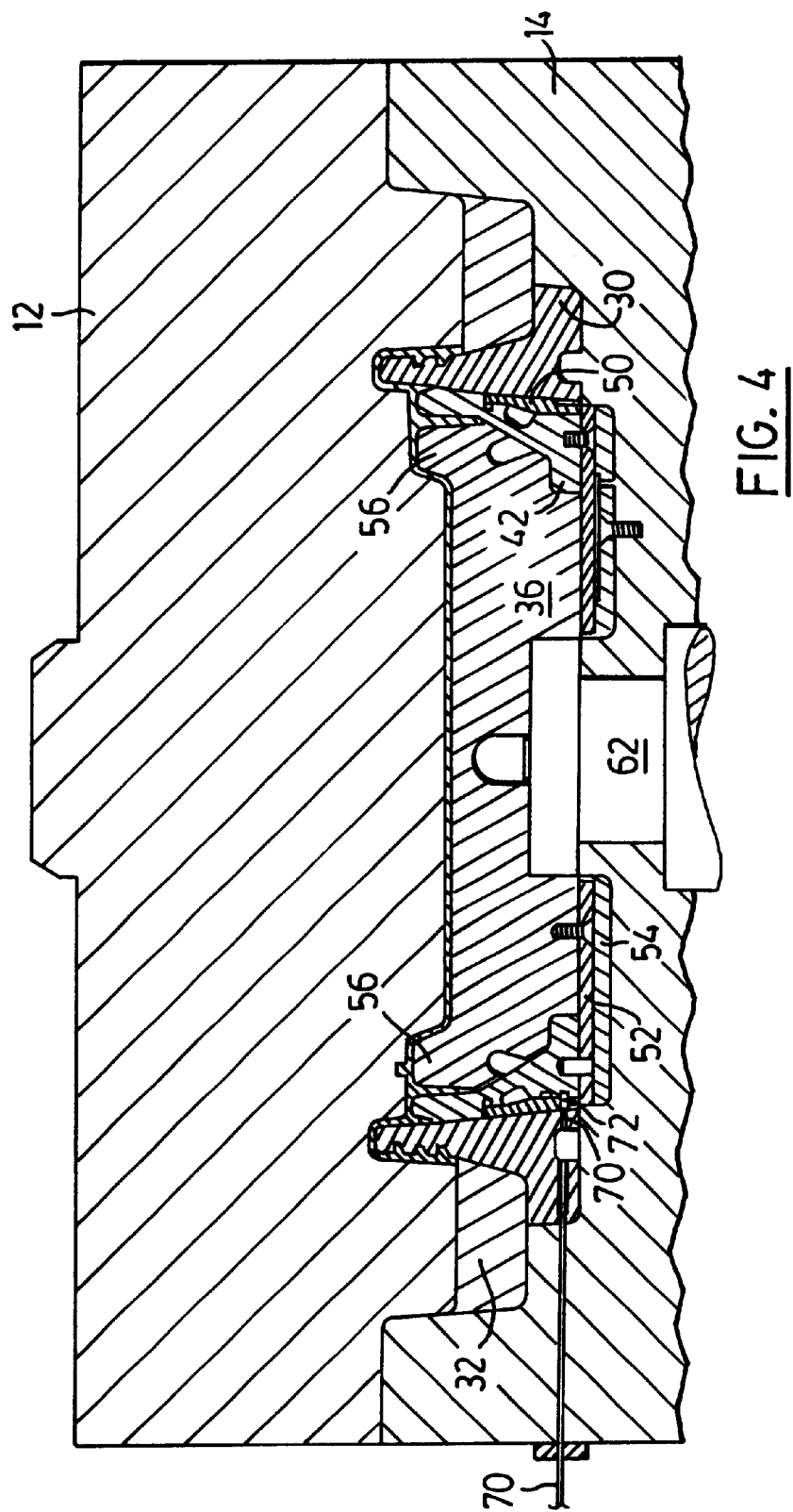
FIG. 4 is a sectional view of the mold similar to FIG. 1, but taken in the direction of lines 4—4 of FIG. 3.

Referring next to FIGS. 1 and 3, core mold portion 14 includes a stationary annular ring 30 which defines threads 24. The thread-forming annular ring 30 is held fixed in position by an annular clamping wedge 32 fastened in core mold portion 14 in any suitable fashion (not shown). Thread-forming annular ring 30 has suitable cooling passages 34 formed therein and is beryllium-titanium coated or plated to facilitate cooling and the removal of lid 22 therefrom, as will be described further below.

Core mold portion 14 also includes a rotatable center section 36 co-axially located inside thread-forming annular ring 30. Center section 36 includes suitable cooling passages 38, 40 (see FIG. 1). Rotatable center section 36 also includes a peripheral annular bearing member 42 attached thereto such as by cap screws 44. Annular bearing member 42 includes an outer peripheral, annular, tapered bearing surface 46 which mates with an inner, annular, tapered bearing surface 48 formed on the inside of thread forming annular ring 30. The tapered bearing surfaces 46, 48 provide a seal between center section 36 and thread-forming annular ring 30 during the molding process and also prevent center section 36 from seizing up inside thread-forming annular ring 30, such as may result from expansion and contraction of the mating parts. Annular bearing member 42 also includes an annular wear ring 50 to reduce friction between center section 36 and thread-forming annular ring 30 as the center section 36 is rotated to release a lid from the mold, as discussed further below. Similarly, center section 36 includes a lower bearing plate or plates 52 which bear against a corresponding bearing plate or plates 54 mounted in core mold portion 14, again to facilitate the rotation of center section 36 in core mold portion 14.

Rotatable center section 36 is also formed with axially disposed engagement surfaces or lugs 56 with slots 58 therebetween (see FIG. 3) to form webs 60 (see FIG. 5) in a molded lid 22. The engagement surfaces or lugs 56 bear against webs 60 to turn or rotate lid 22 with rotatable center section 36 to unscrew lid 22 and remove it from the mold after it has been molded and mold portions 12, 14 have been separated. As can be seen from FIGS. 1 and 3, the engagement surfaces in the illustrated embodiment also extend in an outwards direction relative to the axis of rotation of the center section 36 and thus are able to push against the webs 60, which extend in the same outwards direction, when the center section is rotated.

Rotatable center section 36 and thread-forming annular ring 30 preferably are formed of a beryllium-copper alloy to facilitate cooling. The wear rings and bearing plates, such as bearing plate 52 preferably are formed of an aluminum-bronze alloy for wear resistance. The other components of injection mold 10 are typically formed of tool steel.

Rotatable center section 36 is rotated by being connected to a drive means in the form of a hollow axial drive shaft 62. Drive shaft 62 is hollow to form cooling passages 64, which feeds coolant to cooling passages 34, 38 and 40. Drive shaft 62 is driven by a worm gear 66 engaging a pinion 68 mounted on drive shaft 62. The travel or rotation of worm gear 66 is controlled at least in part by a fiber-optic probe 70 (see FIG. 5). Probe 70 senses the presence of a peripheral hole 72 formed in central section 36 and stops the rotation of central section 36 at the appropriate time when hole 72 is aligned with probe 70. Probe 70 thus forms means for registering the core mold portion center section 36 prior to the injection process. This would be required, for example, where lid 22 is to include such things as a fill opening (formed by plug 28 as described above). If just a plain lid is produced with no special features that are required to be positioned at specific locations in the lid, then probe 70 can be eliminated or not used, and then it is only necessary to turn rotatable center section 36 enough to unscrew the lid from the mold to complete each molding cycle.

Figure 5:
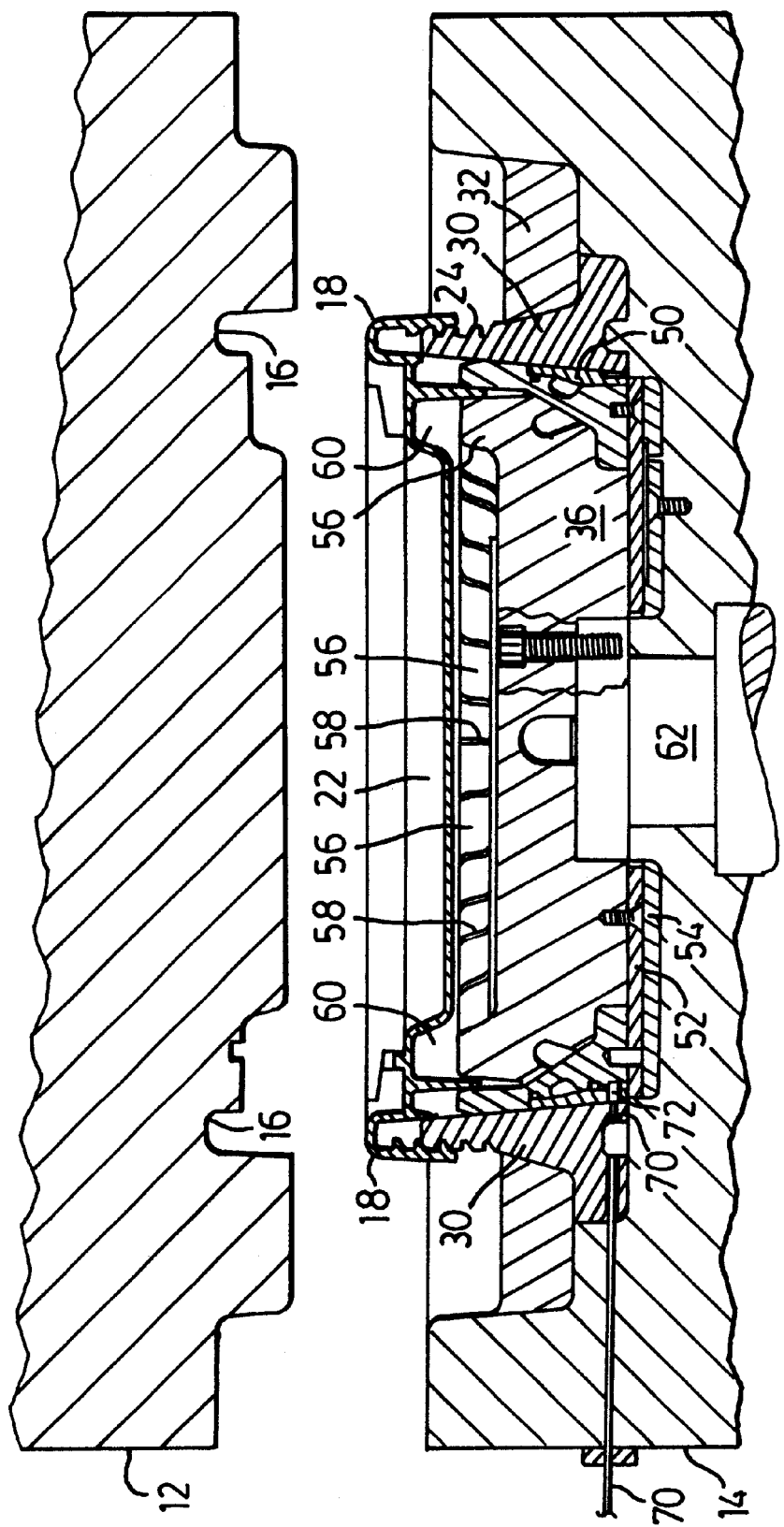
FIG. 5 is a sectional view similar to FIG. 4 but showing the core and cavity mold portions separated and a container lid being screwed off the core portion.

In operation, the mold cavity and core portions 12, 14 start out separated as indicated in FIG. 5, but without a lid 22 located therein. The cavity and core mold portions 12, 14, will have previously been shaped or configured, of course, to produce a specific shape of the lid desired to be produced. The mold portions are then closed, plastic is injected therein to form lid 22. After the lid is cooled sufficiently to retain its shape, the lid mold portions 12, 14 are separated or opened, and rotatable center section 36 is rotated to spin lid 22 and unscrew it or release it from thread-forming annular ring 30. Lid 22 then drops out of injection mold 10, probe 70 senses the position of center section 36 and re-sets its position, so that the center section is in proper registration for the next molding cycle. It will be appreciated that lid 22 is removed from injection mold 10 or effectively driven or pulled off mold 10 without any axial movement of the mold components, other than opening and closing the mold, of course.

Having described preferred embodiments of the invention, it will be appreciated that various modifications may be made to the structures described above. For example, thread-forming annular ring 30 is shown configured to produce a thread on the inside of a peripheral annular skirt of lid 22. However, annular ring 30 could be reversed with threads 24 on the inside, so that exterior threads are formed on the injection molded lid if desired. It will also be appreciated that in some cases, an operable thread on a container lid may not even be required, but the method and apparatus of the present invention could be used simply as a method of removing a lid from an injection mold. For that matter, the injection molded article does not even have to be a container lid, it could be any other injection molded item. It will also be appreciated that the container itself could be injection molded using the present invention with suitable modifications to the cavity and core mold portions.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A threaded lid injection mold comprising:
    a cavity mold portion defining the outer shape of an injection molded lid;
    a core mold portion defining the inner shape of the injection moulded lid, the cavity and core mold portions mating to define the shape of the lid and including means for injecting plastic into the mold to form the lid and means for separating the mold portions to permit removal of the molded lid;
    the core mold portion including a stationary thread forming annular ring and a co-axial rotatable center section located inside the annular ring, the center section including axially disposed engagement surfaces for turning the molded lid upon rotation of said center section after a lid has been molded and the mold portions have been separated; and
    drive means for rotating the center section.

2. An injection mold as claimed in claim 1 wherein the annular ring includes an inner, annular, tapered bearing surface and the center section includes an outer peripheral, annular, tapered bearing surface mating with said ring inner bearing surface, so that internal pressure in the mold during the molding process seals the inner center section against the annular ring.

3. An injection mold as claimed in claim 1 and further comprising means operably connected to the drive means for registering and correctly positioning in the direction of rotation the core mold portion center section prior to the injection process.

4. An injection mold as claimed in claim 3 wherein the means for registering and correctly positioning the core mold centre section includes a fiber-optic probe located in the mold to sense the position of the mold center section.

5. An injection mold as claimed in claim 1 wherein the thread forming annular ring is beryllium-titanium coated.

6. An injection mold as claimed in claim 1 wherein the drive means includes an axial drive shaft connected to the center section.

7. An injection mold as claimed in claim 6 wherein said axial drive shaft is hollow and includes cooling passages for the annular ring.

8. An injection mold as claimed in claim 1 wherein the center section engagement surfaces are in the form of axially disposed projections, so that the lid can be pulled off the center section by being spun without axial movement of the center section.

9. An injection mold according to claim 1 wherein said axially disposed engagement surfaces are provided by axially projecting lugs formed on said center section.

10. An injection mold according to claim 9 wherein a plurality of slots are formed between said lugs in order to form webs in the lid molded by the injection mold.

11. An injection mold according to claim 1 wherein said engagement surfaces are planar and extend in planes that are parallel to said central axis of rotation.

12. An injection mold according to claim 1 wherein said center section is rotatable about a center axis of rotation and said engagement surfaces also extend in an outwards direction relative to said axis of rotation.

13. An injection mold according to claim 1 wherein said axially disposed engagement surfaces form webs in the mold lid, and during use of the rotatable center section, said engagement surfaces turn the molded lid by engaging and bearing against said webs.

14. A method of injection molding a threaded lid comprising the steps of:

providing a mold having mating cavity and core mold portions to define the shape of the lid and one of said cavity and core portions including a stationary thread-forming annular ring;

closing the mold portions;

injecting plastic therein to form the lid;

opening the mold portions; and spinning the molded lid to unscrew the molded lid and release the molded lid from the thread-forming annular ring, wherein the molded lid is spun by providing a mold center section axially located inside the annular ring, said center section including axially disposed engagement surfaces for molding portions of said threaded lid and for engagement with said lid injection molded in the mold, and wherein said engagement surfaces are caused to engage and bear against said portions of said threaded lid when the lid is spun by spinning the center section to unscrew the lid from the annular ring.

15. A method as claimed in claim 14, wherein the center section is spun by providing an axially disposed rotatable drive shaft operatively connected thereto.

16. A method as claimed in claim 15 and further comprising the step of cooling the annular ring by flowing coolant through the rotatable drive shaft and the annular ring.

17. A method of injection molding a threaded lid according to claim 14 wherein said mold center section is rotatable about a central axis of rotation and said engagement surfaces also extend in an outwards direction relative to said central axis.

18. A method of injection molding a threaded lid according to claim 14 wherein, during said injection step, said axially disposed engagement surfaces form webs on the molded lid, and when the lid is spun, said engagement surfaces engage and bear against said webs on the molded lid.

* * * * *